United States Patent Office 3,507,801
Patented Apr. 21, 1970

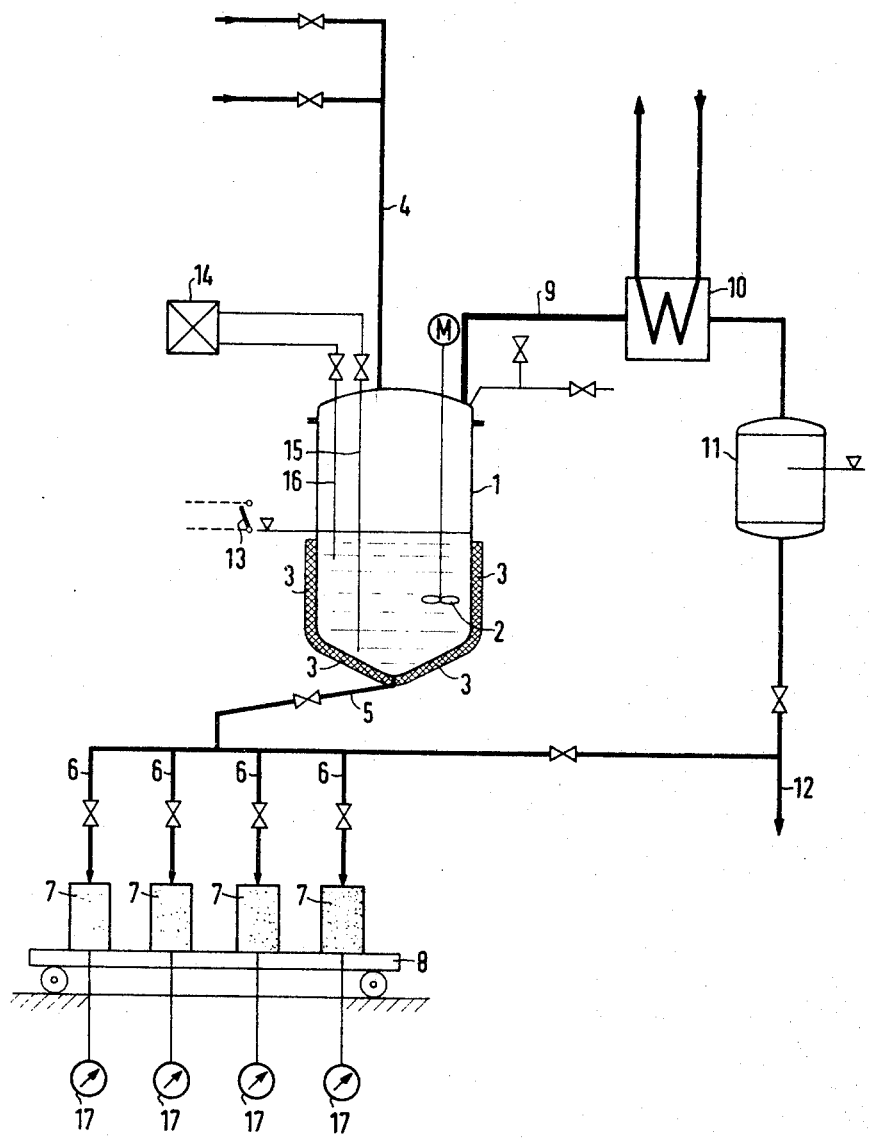

3,507,801
ENTRAPMENT OF RADIOACTIVE WASTE
WATER USING SODIUM BORATE
Ivan Kausz and Jong-Dok Kim, Erlangen, Germany, assignors to Siemens Aktiengesellschaft, a corporation of Germany
Filed Apr. 29, 1968, Ser. No. 725,003
Claims priority, application Austria, Feb. 19, 1968,
A 1,540/68
Int. Cl. G21f 9/16, 9/04
U.S. Cl. 252—301.1                        5 Claims

ABSTRACT OF THE DISCLOSURE

Radioactive waste water is given an addition of sodium borate solution. The mixture is thickened by heating until the remaining quantity of water is small enough to be bondable by the sodium borate as water of crystallization. The hot and still liquid concentrate is drained into storage containers in which it cools and crystallizes.

---

Our invention relates to a process and apparatus for final concentration and storing of radioactive waste water.

In the operation of nuclear reactors regulated chemically with the aid of boric acid, it is known to neutralize the radioactive waste water, stemming from the primary circulation of the reactor, by giving the water an admixture of sodium lye or sodium hydroxide thus bonding the boron as sodium borate or sodium metaborate.

It is further known in the ultimate processing of such radioactive sodium borate solutions to bond these liquid wastes into bitumen or portland cement to permit storing them in solid constitution. The use of bitumenizing or cementing plants, however, greatly increases the quantity of substance to be stored and involves an increased fire hazard, particularly with bitumenizing plants, since the bitumen must be hot when being mixed with the waste waters.

It is an object of our invention to provide less complicated and less costly methods and means for the final processing and storing of such waste waters; and it is also an object of the invention to devise a process and equipment for obtaining such improvements in a more reliable, safer and more economical manner.

According to the invention, the waste waters which for decontamination are given an addition of sodium borate solution, are subjected to thickening by heating until the remainining quantity of water is no larger than can be bonded as water of crystallization to the sodium borate, and the thus thickened concentrate is then exposed to crystallizing cooling so that the remaining water becomes incorporated into the solid crystals.

The effect of such thickening of the mixture, on the one hand, is to considerably reduce the volume of the substances to be stored and, on the other hand, to cause solidification of the solution simply due to cooling and without further additions.

The process is applicable not only with waste water stemming from the primary circulation of a nuclear reactor and already containing sodium borate, but the process is also applicable to other resulting radioactively soiled or contaminated water, such as laboratory waste water, decanted water, sump water and wash water, which contains dissolved and undissolved solid substances and to which a solution of sodium borate is to be added in order to then subject these radioactively soiled waters to the further processing according to the invention resulting in bonding and solidifying the waste as water of crystallization.

According to another feature of our invention, we perform the above-described process with the aid of apparatus which comprises a thickening vessel equipped with a stirring mechanism and with a heating device in its jacket. A controllable or regulatable supply for the waste waters enters through the cover of the vessel, and a controllable or regulatable outlet for the thickened concentrate issues from the lowest spot of the vessel. The still hot and liquid concentrate drained or drawn off through the outlet is filled into storage containers in which the concentrate is subjected to crystallization.

The invention will be further described with reference to an embodiment of processing apparatus according to the invention schematically illustrated by way of example on the accompanying drawing.

The heat of the illustrated plant is constituted by a cylindrical thickening vessel 1 which is provided with a stirrer 2 whose jacket-bottom region is heated from the outside by heating devices 3. The lowest water level in the vessel 1 is kept above the top of the heating zone in order to prevent local overheating and crust formation. For this reason, the vessel 1 is equipped with a lower limit sensor 13 which switches off the heaters of device 3 when the liquid level drops to the minimal level determined by the locality of the sensor. The actual water level as well as the density of the concentrate are measured by a measuring device 14 operating on the bubble-through principle. The measuring probes 15 and 16 extending from the device 14 extend downwardly to the bottom of the processing vessel 1 and to beneath the minimum surface level respectively.

The radioactive waste waters, coming from concentration tanks (not illustrated), enter into the vessel 1 through a line 4 which passes through the cover of the vessel. The heating device 3 and the stirrer 2 are simultaneously kept in operation to obtain a uniformly increasing concentration throughout the liquid contained in the vessel. The thickening process is terminated when the device 14 indicates the calculated or tested concentration that corresponds to the quantity of water acceptable to crystalline sodium borate in the form of water of crystallization. When thus the evaporation of the excessive amount of water is terminated, the sodium borate solution, still liquid at high temperature, is filled into storage containers 7 through a controlled outlet 5 extending from the bottom of the vessel 1 through a branch pipe 6. The filling condition of each storage container 7 is measured by a force gauge 17. For example, when the first storage container 7 is filled, the supply valve in the first branch line 6 closes and the corresponding valve in the next branch line opens, so that the available storage containers 7 are filled sequentially, the total volume of these containers corresponding approximately to a single charge of the thickening vessel 1. Subsequently, the storage containers 7 are transported on a carriage 8 to the storing locality. The solution contained in the container 7 cools gradually and solidifies since only the bondable water of crystallization is retained in the sodium borate solution.

The steam issuing from the vessel 1 during the thickening process passes through a line 9 to a heat exchanger 10 in which the steam condenses. The condensate is caught in a tank 11 and ultimately drained through a line 12 to a waste water reservoir.

During thickening and stirring of the sodium borate solution in vessel 1 there may occur the formation of foam above the liquid level. For that reason, a measuring device (not illustrated) on the principle of electrical conductivity measurement may be provided. Since the foam may contain radioactive components, the measuring device can be used for preventing the foam from flowing into the heat exchanger 10 and condensate tank 11 together with the steam.

The use of sodium/borate solution has been found particularly advantageous and simple because in most cases chemically regulated reactors already contain boron in the primary circulation. If desired, however, sodium borate may be substituted by a different salt in which a portion of the solvent water is bonded as water of crystallization so that the corresponding solution will solidify upon evaporation of the excess amount of water.

It will thus be seen that by means of the process and the thickening plant according to the invention the final volume of the waste waters can be reduced in a simple and economical manner and that these waste waters can be thickened without additions and be converted to solid constitution. In comparison with comparable plants heretofore available, the above-described plant is particularly reliable in operation due to the fact that it is particularly simple and does not involve any such fire hazard as a plant involving the use of bitumen. Furthermore, a corrosion of the storage container in the final storage condition of the waste water is virtually avoided.

To those skilled in the art it will be obvious upon a study of this disclosure that our invention permits of various other modifications and hence may be given embodiments different from those particularly illustrated and described herein, without departing from the essential features of our invention and within the scope of the claims annexed hereto.

We claim:

1. The process for final concentration of radioactive waste water which contains sodium borate solution, comprising the steps of thickening the borate-containing water by heating until the remaining quantity of water corresponds to the one bondable to the sodium borate as water of crystallization, and then cooling the concentrate to effect crystallization of the sodium borate.

2. The process for final concentration and storing of radioactive waste water, which comprises adding sodium borate solution to the radioactive waste water, thickening the borate-containing liquid by heating until no more water remains than is bondable to the sodium borate as water of crystallization, and then cooling and storing the concentrate to effect crystallization, whereby the remaining water becomes bonded into solid sodium borate.

3. The process according to claim 2, which comprises adding solids-containing further waste water to the liquid prior to terminating the thickening of the liquid.

4. The process according to claim 2, which comprises filling the thickened and still not concentrate into storage containers and permitting the containers to cool to effect said crystallization in said containers.

5. The process according to claim 2, which comprises performing the thickening of the liquid in a mixing vessel while simultaneously heating and stirring the liquid, then draining the thickened concentrate into storage containers and permitting the containers to cool during storage to effect said crystallization in said containers.

References Cited
UNITED STATES PATENTS 3,008,904 11/1961 Johnson et al. _____ 252—301.1
3,191,662 6/1965 Schneider _____ 252—301.1

CARL D. QUARFORTH, Primary Examiner

S. J. LECHERT, Assistant Examiner